(12) United States Patent
Engineer

(10) Patent No.: US 11,922,978 B1
(45) Date of Patent: Mar. 5, 2024

(54) TANGENTIAL TRACKING SOLUTION FOR A TONEARM

(71) Applicant: Arun Keshavram Engineer, Mumbai (IN)

(72) Inventor: Arun Keshavram Engineer, Mumbai (IN)

( * ) Notice: Subject to any disclaimer, the term of this patent is extended or adjusted under 35 U.S.C. 154(b) by 0 days.

(21) Appl. No.: 18/192,319

(22) Filed: Mar. 29, 2023

(51) Int. Cl.
G11B 3/38 (2006.01)

(52) U.S. Cl.
CPC ............................ G11B 3/38 (2013.01)

(58) Field of Classification Search
None
See application file for complete search history.

(56) References Cited

U.S. PATENT DOCUMENTS

| | | | | | |
|---|---|---|---|---|---|
| 2,529,676 | A * | 11/1950 | Carris | ...................... | G11B 3/34 369/250 |
| 2,837,339 | A * | 6/1958 | Puda | ........................ | G11B 3/38 74/516 |
| 2,977,126 | A * | 3/1961 | Chalfin | .................... | G11B 3/08 369/250 |
| 3,283,411 | A * | 11/1966 | Steward | ................... | G11B 3/00 33/645 |
| 3,502,339 | A * | 3/1970 | Tatter | ....................... | G11B 3/14 369/252 |
| 3,963,246 | A * | 6/1976 | Trochimowski | ......... | G11B 3/12 369/255 |
| 4,121,834 | A * | 10/1978 | Yestrebi | ............. | G11B 3/08583 369/233 |
| 4,182,517 | A * | 1/1980 | Rosenberg | ............... | G11B 3/12 369/247.1 |
| 4,232,202 | A * | 11/1980 | Mori | ........................ | G11B 3/40 369/63 |
| 4,295,277 | A * | 10/1981 | Dennesen | ................ | G11B 3/38 |
| 4,368,527 | A * | 1/1983 | Goldstein | ................ | G11B 3/38 33/645 |
| 4,497,053 | A * | 1/1985 | Wolff | ....................... | G11B 3/38 369/255 |
| 2018/0286435 | A1* | 10/2018 | Son | .......................... | G11B 3/38 |
| 2019/0244633 | A1* | 8/2019 | Ono | .......................... | G11B 3/34 |
| 2020/0043520 | A1* | 2/2020 | Son | .......................... | G11B 3/42 |

* cited by examiner

Primary Examiner — William J Klimowicz
(74) Attorney, Agent, or Firm — Dunlap Bennett & Ludwig, PLLC

(57) ABSTRACT

A method of improving a sound reproduction of a turntable, the includes rotatably coupling a stylus cartridge to a head shell of a tonearm; and mechanically communicating the stylus cartridge and a spindle of the turntable, whereby rotation of the stylus cartridge is guided by said mechanical communication so that the stylus cartridge remains tangent to a groove of a grooved disc rotating with the spindle.

2 Claims, 4 Drawing Sheets

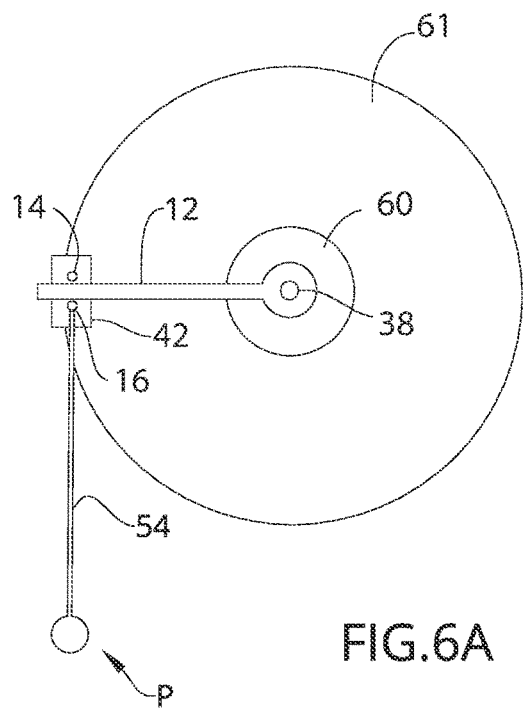 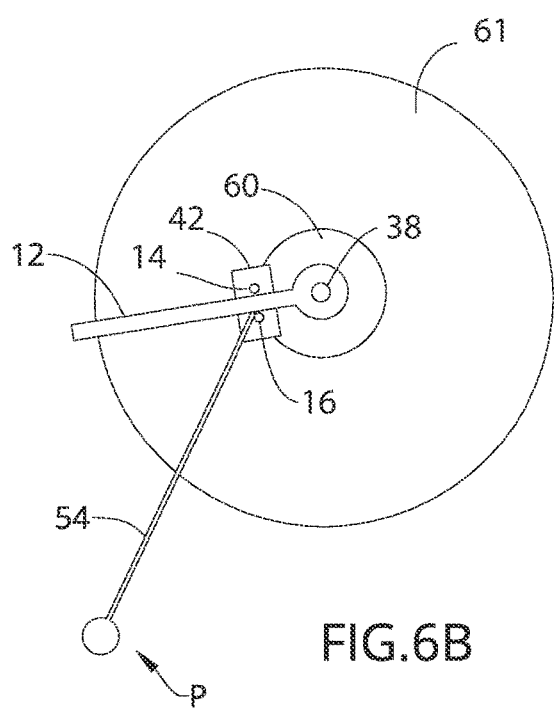
FIG.6A  FIG.6B
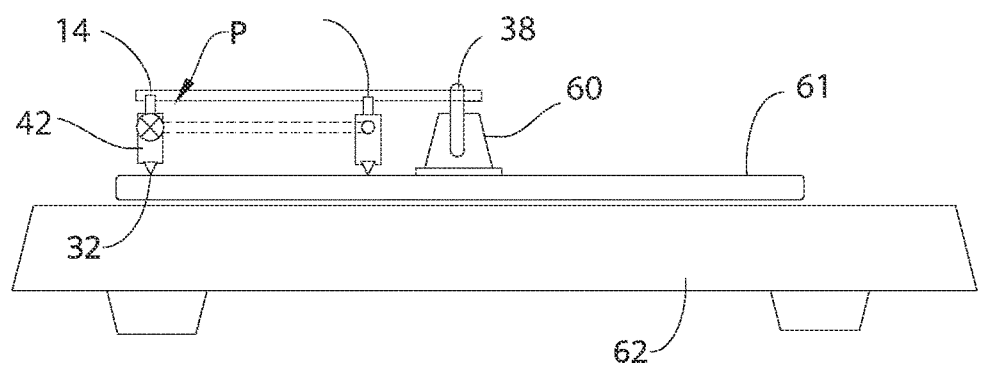
FIG.7

TANGENTIAL TRACKING SOLUTION FOR A TONEARM

BACKGROUND OF THE INVENTION

The present invention relates to audio turntables and, more particularly, a tangential tracking solution for use with an audio turntable having a pivoted tonearm to maintain tangential tracking of the tonearm's stylus, thereby increasing accurate reproduction of sound.

The groove of a vinyl record is cut by a tangential cutter during production. This type of cutting maintains the cutter tangency from the outer start groove to the inner end groove. Audio turntables currently have either a pivoted tonearm (e.g., a straight, S-shaped tonearm) or a tangential moving tonearm. The tonearm enables the stylus to maintain tangential orientation to the rotating vinyl record groove.

A pivoting tonearm provides a fixed cartridge/stylus near its distal end, wherein the stylus transduces music cut into the grooves as the vinyl record turns. Due to the offset between the cartridge's axis (which is approximately tangential to the disc) and the tonearm's pivot, optimal tangency between the cartridge/stylus and the rotating grooves is only maintained at a certain point of the vinyl's groove. On either side of this optimum, the tangency is not optimal, causing tracking error and compromising sound reproduction. In sum, due to the geometry of the pivoting arm most commercial tonearms are unable to allow the stylus to accurately track tangentially to the groove across the entire record playing surface, thereby compromising sound reproduction authenticity. In other words, the angle of skew/error of the stylus cartridge varies with respect to a chord of the circular record (and groove) while the tonearm rests on the record.

As can be seen, there is a need for a tangential tracking solution for maintaining tangential tracking of a pivoted tonearm's stylus, thereby enabling accurate reproduction of sound as well as minimizing asymmetric wear of styli and grooves.

SUMMARY OF THE INVENTION

The present invention provides method of maintaining tangential tracking of the cartridge/stylus at all radial positions on the vinyl record, wherein the method embodies a mechanism to be incorporated within existing tonearm, thereby reproducing faithfully the original sound signature cut in the vinyl groove.

By providing a mechanism to track the grooves' tangency from the start groove to end groove, the present invention follows the original cutter path. Hence it reproduces the music cut in the vinyl surface with high fidelity.

Due to the desire to maintain accurate tangency during the entire sweep of the tonearm across the vinyl record the present invention provides a tracking cartridge system. With the aid of a tracking rod which guides two coupling pins attached to the cartridge, by way of a rotatable cartridge assembly, the system rotates the cartridge to track tangency for the stylus as it follows the record groove from the outer starting groove of the vinyl to its inner ending groove.

In one aspect of the present invention, a method of improving the sound reproduction of a turntable, the method including rotatably coupling a stylus cartridge to a head shell of a tonearm; and interconnecting the stylus cartridge and a spindle of the turntable, whereby rotation of the stylus cartridge is guided by said interconnection so that the stylus cartridge remains tangent to a groove of a grooved disc rotating with the spindle.

In another aspect of the present invention the method of improving a sound reproduction of a turntable further includes wherein the stylus cartridge rotates independently of the head shell of the tonearm; including operating associating a tracking rod with the spindle to form the mechanical communication, wherein the mechanical communication further comprises two pins sandwiching a distal portion of the tracking rod, wherein the two pins are fixed to a pivot shaft enabling the stylus cartridge to rotate relative to the head shell of the tonearm.

In yet another aspect of the present invention a method of improving a sound reproduction of a turntable includes mechanically communicating a spindle of the turntable to a stylus transducing the sound reproduction so as to maintain a tangential tracking of the stylus.

In still yet another aspect of the present invention a device for improving a sound production of a turntable includes the following: a pivot shaft rotatable coupled to a mount of a transducing stylus so that the transducing stylus independently of the mount; a mechanical communicator attached to the pivot shaft; and an elastic object that stores mechanical energy interconnecting said mount and the pivot shaft.

In yet still another aspect of the present invention a system of improving a sound production of a turntable, the system includes the above device and a tracking rod having a first portion and a second portion, wherein the first portion mechanically communicates with the mechanical communicator, and wherein the second portion couples to a spindle of the turntable so as to rotate therewith, wherein the mechanical connector is two pins at an elevation above said mount.

These and other features, aspects and advantages of the present invention will become better understood with reference to the following drawings, description and claims.

BRIEF DESCRIPTION OF THE DRAWINGS

FIG. 4B also illustrates an overhang 90, to prevent the pins from sliding off during initial tracking.

FIG. 6A is a top plan view of an exemplary embodiment of the present invention, showing the cartridge rotation mechanism connected to the tracking rod, which in turn is connected to the spindle, wherein the tonearm's stylus is at the outer start of the groove $C_1$ of the vinyl 61.

FIG. 6B is a top plan view of an exemplary embodiment of the present invention, showing the cartridge rotation mechanism connected to the tracking rod, which in turn is connected to the spindle, wherein the stylus of the tonearm 54 is at the inner end of the groove $C_1$ of the vinyl 61.

FIG. 7 is a side elevation view of an exemplary embodiment of the present invention, showing the cartridge rotation mechanism connected to the tracking rod, which in turn is connected to the spindle, illustrating movement of the tracking rod assembly.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
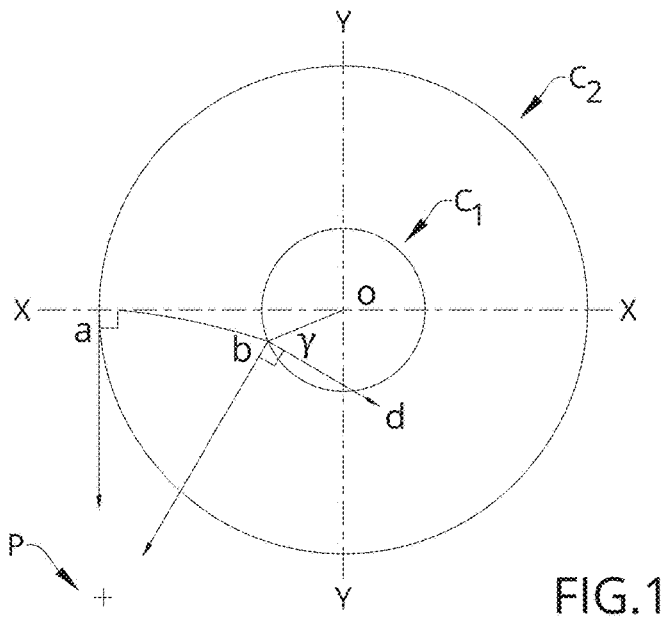
FIG. 1 is a schematic view of exemplary groove of a vinyl record, illustrating the angle of error that occurs due to the offset between the cartridge's axis (which, in this view, is approximately tangential to the disc at point 'a'—i.e., the intersection of the negative side of the 'X' axis and the outer end $C_2$ of the groove of the record) and the tonearm's pivot, P, whereby optimal tangency between the cartridge/stylus and the groove is only maintained at one (radial) point along the groove (typically, though, it is the midpoint of the vinyl's groove). $C_1$ is the inner end of the groove. The X-axis ('X') and the Y-axis ('Y') intersect at 'o' the center of the two circles, and the location of the spindle of the turntable. Reference 'b' is the intersection of the negative side of the 'X' axis and the inner end $C_1$. Imagining a straight line drawn from 'a' to 'P' defines a radius of a circle having an arc extending from 'a' to 'b', which is the path of the stylus of the cartridge that is mounted on the tonearm. Vector 'd' is perpendicular to point 'b' and represents the direction of the stylus while, in contrast, for perfect tracking 'bo' should be the direction of the stylus. Therefore, the stylus is off track by angle 'obd' (angle Y) at 'b', making the angular deviation or angle of error 'Y' due to the position of the stylus at 'b'. For the stylus to be in perfect tracking position it must be in radial direction pointing to the center 'o' throughout its travel from the outer start of the groove $C_2$ to the inner end of the groove $C_1$ of the vinyl. For the stylus to be in perfect tracking position throughout its path (clockwise) 'ab' it is necessary for the cartridge to be able to rotate about its vertical axis so that the stylus "points" to the center 'o' all through its travel motion.
Figure 2A:
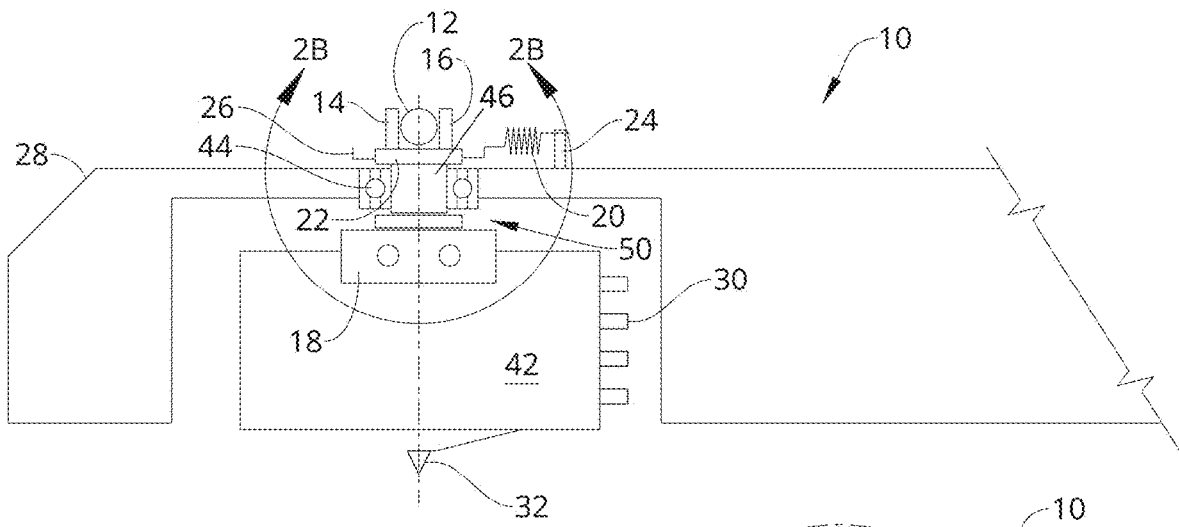
FIG. 2A is a schematic view of an exemplary embodiment of the present invention, illustrating a cartridge rotation mechanism.
Figure 2B:
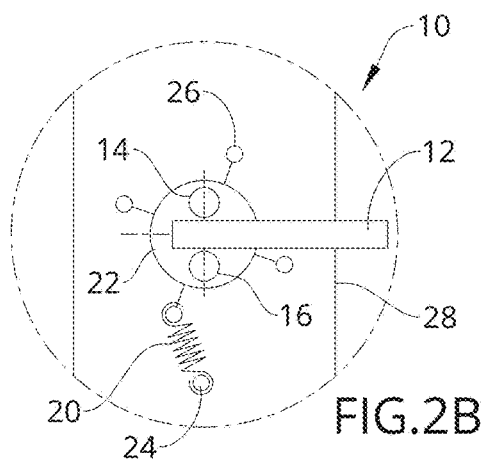
FIG. 2B is a detailed schematic view of the cartridge rotation mechanism.
Figure 3A:
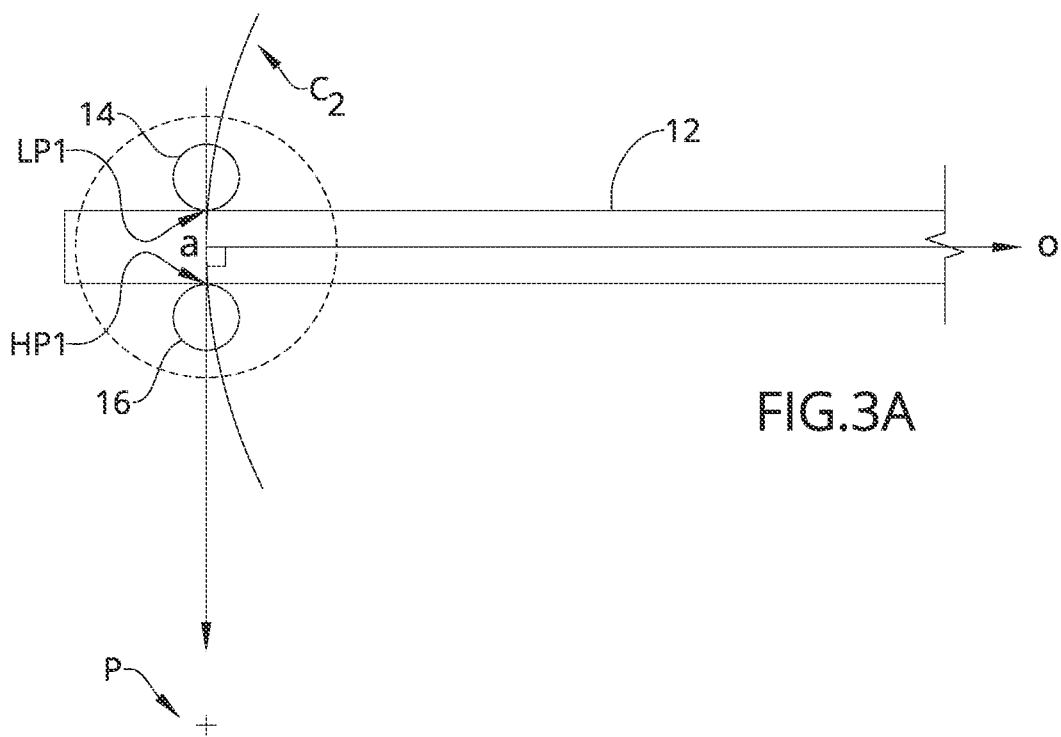
FIG. 3A is a detailed schematic view of the cartridge rotation geometry at the outer start of record groove $C_2$, wherein the position of the cartridge and stylus at 'a'. The two pins 14 and 16 rotate through angle 'Y' when a tracking rod 12 is placed between them across 'ao'.
Figure 3B:
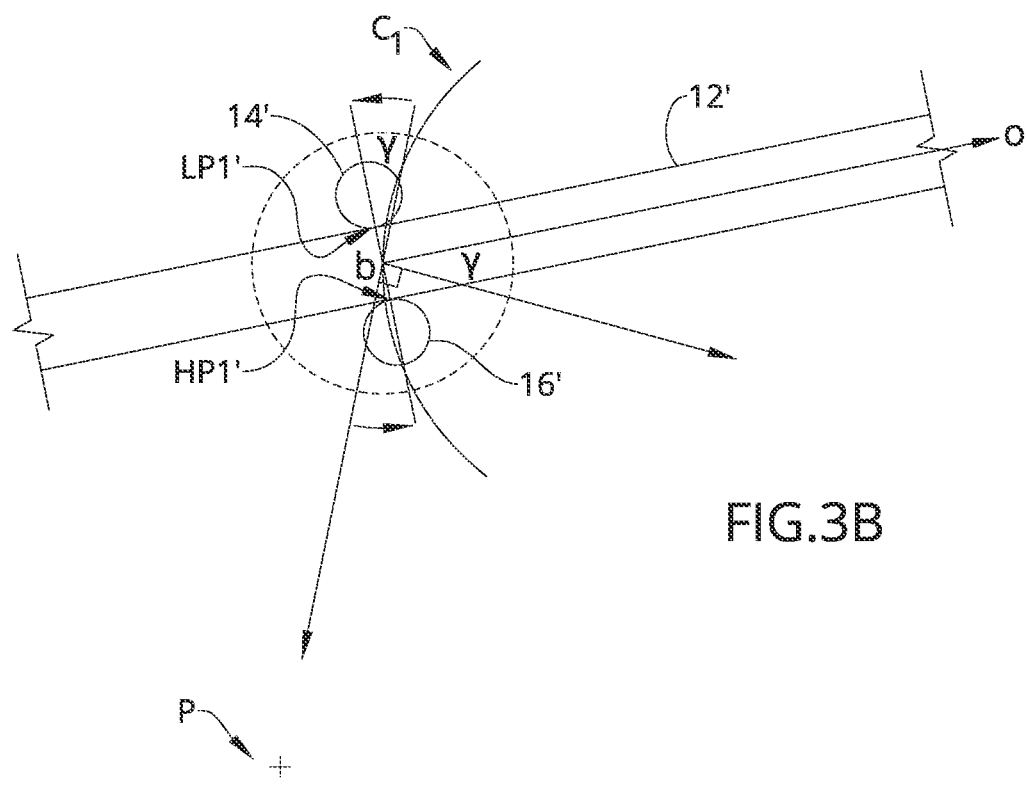
FIG. 3B is a detailed schematic view of the cartridge rotation geometry at the inner end of the record groove $C_1$, illustrating that when the stylus reaches the end of the groove at 'b' the tracking rod 12 will rotate the cartridge body 42 by angle 'Y' such that the stylus 32 "points" in the direction of 'bo'. The clearance between the two pins 14 and 16 is such that the tracking rod 12 will not cause the cartridge 30 to lock-up from rotating.
Figure 4A:
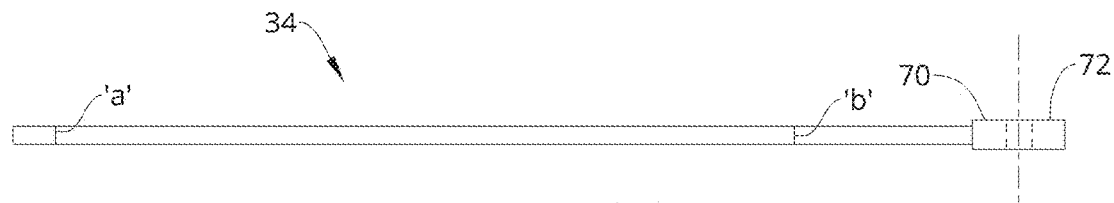
FIG. 4A is a detailed elevation view of an exemplary embodiment of a tracking rod assembly of the present invention.
Figure 4B:
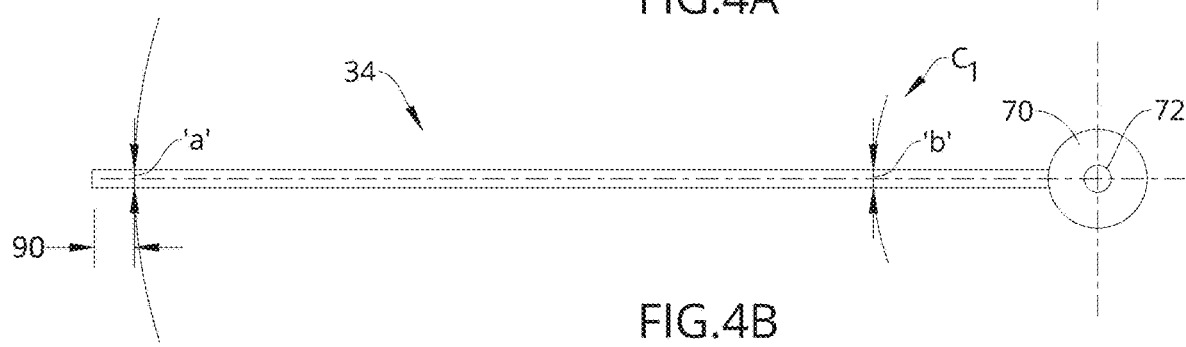
FIG. 4B is a top plan view of an exemplary embodiment of the tracking rod assembly of the present invention, shown in context of the inner and outer ends of record groove $C_1$ and $C_2$.
Figure 5A:
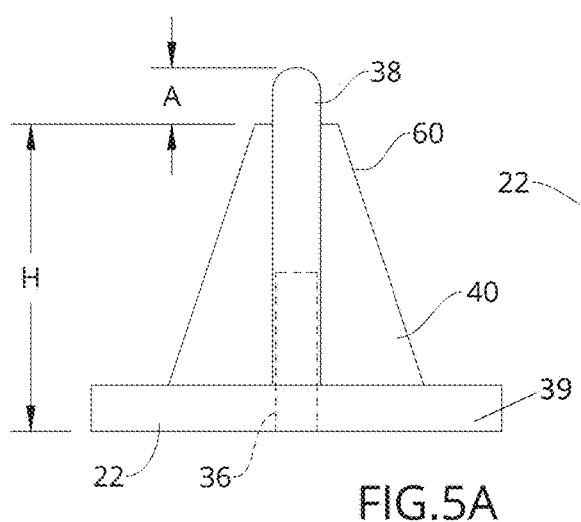
FIG. 5A is a side elevation view of an exemplary embodiment of a post of the present invention.
Figure 5B:
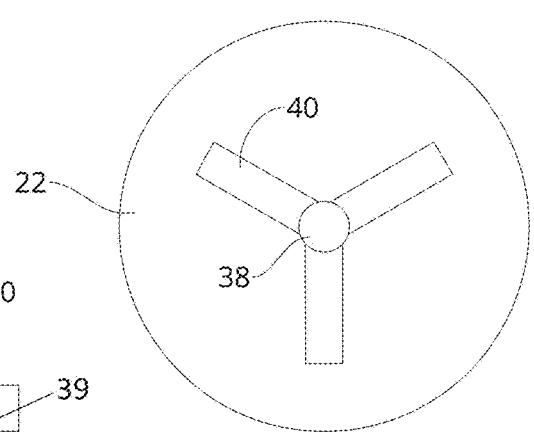
FIG. 5B is a top plan view of an exemplary embodiment of a post of the present invention.

Referring now to FIGS. 1 through 7, the present invention may include a cartridge rotation mechanism 10. The cartridge rotation mechanism 10 includes a mounting assembly 50 for enabling the cartridge's stylus 32 to rotate independently of the tonearm head shell 28. An upper portion of the mounting assembly 50 provides spaced apart first and second guide pins 14 and 16 through which a tracking rod 12 is received. The tracking rod 12 is part of a tracking rod assembly 34 that rotates with the spindle of the turntable, and in turn rotates the cartridge relative to the tonearm, thereby tangential tracking the tonearm's stylus to the groove from its outer start to the inner end.

The mounting assembly 50 rotatably couples the cartridge body 42 to the tonearm head shell 28. The rotational coupling may include a bearing 44, such as but not limited to a roller bearing, and a pivot shaft 46 operatively associated with the bearing 44, whereby rotational freedom is afforded the cartridge body 42. The mounting assembly includes a bracket 18 connecting the cartridge body 42, making it rotatable relative to the tonearm head shell 28. The rotational coupling enables the pre-amp terminals 30 of the cartridge body 42 to function in the manner intended (e.g., terminals 30 are rotating along with the cartridge body 42 and the cartridge stylus 32). The pivotal shaft 46 may be biased in tension by way of an extension spring 20 that interconnects the base plate 22 (or other part of the pivot shaft 46) and a spring post 24 protruding from an upper surface of the tonearm head shell 28. The spring 20 may have an eye on each side that permits engagement of the spring post 24 as well as allows a fastener 26 connected to the base plate 22 (or other part of the pivot shaft 46) to engage the opposing eye of the spring 20.

The first and second pivot shaft guide pins 14 and 16 may be coupled to the mounting assembly 50 by way of the base plate 22. The first and second guide pins 14 and 16 are dimensioned and adapted to contact opposing sides of the tracking rod 12 slide therebetween.

The tracking rod 12 is supported by and rotatably coupled to a rod post 60 operatively associated with the spindle of the turntable. The rod post 60 provides a base plate 39 having a cavity 36 for receiving the spindle so that the rod post 60 rotates under the power of the motor of the turntable 62. The rod post 60 has a protrusion 38 which is dimensioned to receive a rod head 70 by way of a rod head hole 72. The rod head hole 72 provides a bearing surface that prevents any transfer of torque from the rotating rod post 60 to the tracking rod 12. Ribs 40 may extend from the protrusion to the base plate 39, for structural support. The tracking rod 12 is made from lightweight material, such as but not limited to high strength carbon rods. The tracking rod 12 locates the cartridge/stylus 32 tracking angle by aligning the pins 14 and 16 through which it passes as the cartridge/stylus 32 radially moves toward the inner end of the groove $C_1$.

The rotation of the cartridge by a small angle provides the tangency needed to track the stylus 32 across the entire vinyl record. The tracking rod 12 passes through the two guide pins 14 and 16 and since the tracking rod 12 is operatively associated to the spindle end, thereby forcing the rotatable cartridge 42 to remain tangent to the groove rotating it using the pins 14 and 16.

The guide pins 14 and 16 may be made of carbon rods and may be assembled to the bracket 18. A roller bearing 44 may be used which allows the bracket 18 to freely rotate with minimal friction. All components may be made of low mass plastic material. The tracking rod 12 may be made of carbon and nylon bearing material for the tracking rod to support it at the cantilevered end of the rod post 60.

A method of using the present invention may include the following. The cartridge rotation mechanism 10 disclosed above may be provided. A user would connect the tonearm head shell 28 to the distal end of the tonearm. The user would install the rod post 60 over the spindle once the vinyl has been placed on the platter. The person would then install the tracking rod assembly 34 so that the tracking rod head 70 engages the protrusion 38 of the rod post 60 and slide the distal end of the tracking rod 12 between the guide pins 14 and 16.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of improving a sound reproduction of a turntable, the method comprising:
    rotatably coupling a stylus cartridge to a head shell of a tonearm;
    mechanically communicating the stylus cartridge and a spindle of the turntable, whereby rotation of the stylus cartridge is guided by said mechanical communication so that the stylus cartridge remains tangent to a groove of a grooved disc rotating with the spindle; and
    operatively associating a tracking rod with the spindle to form the mechanical communication, wherein the mechanical communication further comprises two pins sandwiching a distal portion of the tracking rod, wherein the two pins are fixed to a pivot shaft enabling the stylus cartridge to rotate relative to the head shell of the tonearm.

2. The method of claim 1, wherein the stylus cartridge rotates independently of the head shell of the tonearm.

* * * * *